United States Patent
Inagaki et al.

(10) Patent No.: US 8,484,682 B2
(45) Date of Patent: Jul. 9, 2013

(54) DISPLAY CONTROL DEVICE, DISPLAY CONTROL METHOD, AND PROGRAM

(75) Inventors: Takeo Inagaki, Tokyo (JP); Gen Fujiki, Tokyo (JP); Miwako Fujiki, legal representative, Tokyo (JP); Yoshihiro Nakanishi, Tokyo (JP); Tsukasa Yoshimura, Tokyo (JP)

(73) Assignee: Sony Corporation (JP)

( * ) Notice: Subject to any disclaimer, the term of this patent is extended or adjusted under 35 U.S.C. 154(b) by 290 days.

(21) Appl. No.: 12/586,446

(22) Filed: Sep. 22, 2009

(65) Prior Publication Data

US 2010/0083317 A1    Apr. 1, 2010

(30) Foreign Application Priority Data

Sep. 22, 2008    (JP) ................ P2008-243259

(51) Int. Cl.
*G06F 3/00* (2006.01)
*G06F 13/00* (2006.01)
*H04N 5/445* (2011.01)

(52) U.S. Cl.
USPC ........................................................... 725/44

(58) Field of Classification Search
USPC .................... 725/44, 37–39, 46–48
See application file for complete search history.

(56) References Cited

U.S. PATENT DOCUMENTS

| 7,873,972 | B2* | 1/2011 | Zaslavsky et al. | 725/41 |
| 2003/0068087 | A1 | 4/2003 | Wu et al. | |
| 2006/0004698 | A1* | 1/2006 | Pyhalammi et al. | 707/2 |
| 2007/0204238 | A1 | 8/2007 | Hua et al. | |
| 2010/0070483 | A1* | 3/2010 | Delgo et al. | 707/706 |
| 2010/0306801 | A1* | 12/2010 | Filippov et al. | 725/44 |

FOREIGN PATENT DOCUMENTS

| JP | 11164215 A | 6/1999 |
| JP | 2001167110 A | 6/2001 |
| JP | 2002064795 A | 2/2002 |
| JP | 2005192223 A | 7/2005 |
| JP | 2005-303743 A | 10/2005 |
| JP | 2008072336 A | 3/2008 |
| JP | 2008098811 A | 4/2008 |
| JP | 2008103784 A | 5/2008 |
| JP | 2008217117 A | 9/2008 |
| WO | 2008051538 A2 | 5/2008 |

OTHER PUBLICATIONS

European Search Report EP 09170716, dated Jan. 24, 2011.
"www.youtube.com" Internet Citation, Jan. 6, 2008, p. 1, XP 002576736.
Office Action from Japanese Application No. 2008-243259, dated Aug. 3, 2010.

(Continued)

*Primary Examiner* — Pankaj Kumar
*Assistant Examiner* — Charles N Hicks
(74) *Attorney, Agent, or Firm* — Lerner, David, Littenberg, Krumholz & Mentlik, LLP

(57) ABSTRACT

A display control device includes: a reception section configured to receive a television broadcast signal; a display section configured to display video information and a thumbnail image contained in the television broadcast signal; and a control section configured to control display on the display section of the video information and the thumbnail image contained in the television broadcast signal received by the reception section. The control section causes the thumbnail image to be displayed in accordance with an order of priority.

14 Claims, 13 Drawing Sheets

OTHER PUBLICATIONS

Technical Report of IEICE, PRMU2003-214, "Estimation of Players' Position From Image Sequences of Soccer Game TV Program", vol. 103, No. 585, pp. 95-100.

Office Action from Japanese Application No. 2010-274661, dated Dec. 6, 2011.

* cited by examiner

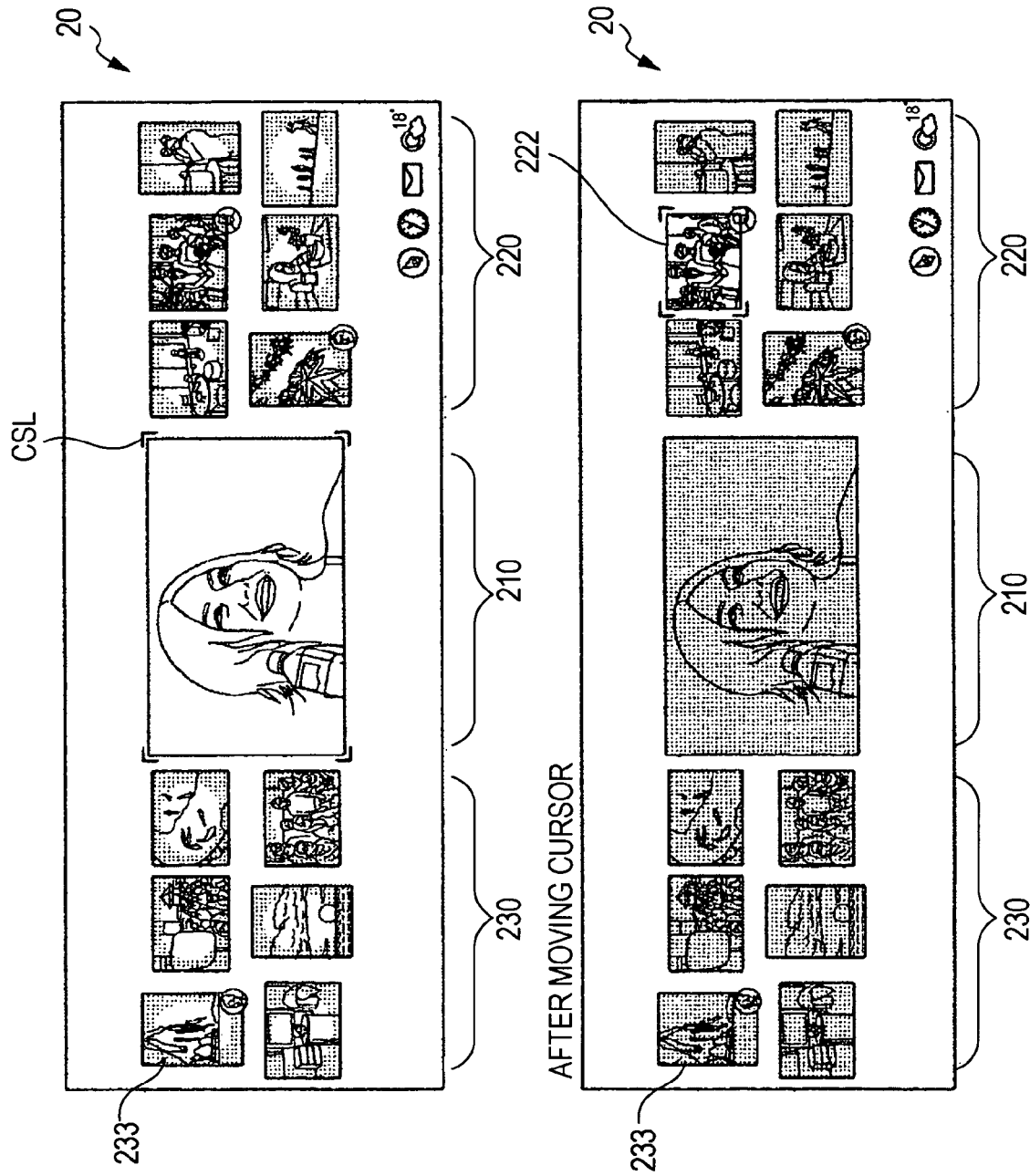

FIG. 11A
FIG. 11B
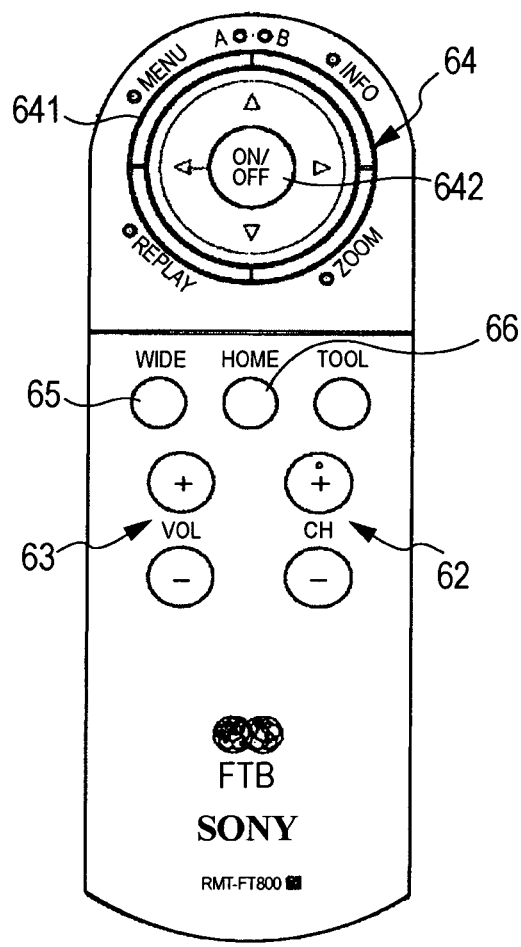
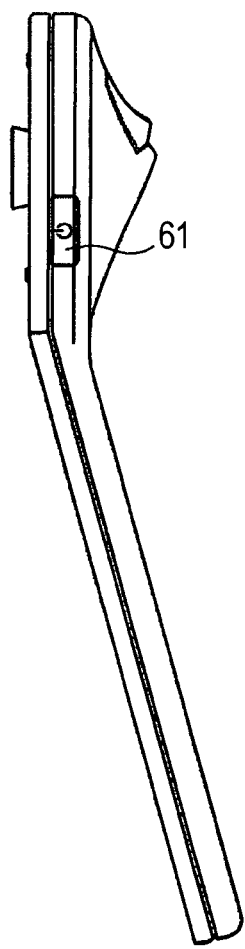

DISPLAY CONTROL DEVICE, DISPLAY CONTROL METHOD, AND PROGRAM

CROSS-REFERENCE TO RELATED APPLICATION

The present application claims priority from Japanese Patent Application No. JP 2008-243259 filed in the Japanese Patent Office on Sep. 22, 2008, the entire content of which is incorporated herein by reference.

BACKGROUND OF THE INVENTION

1. Field of the Invention

The present invention relates to a display control device, a display control method, and a program capable of displaying video information contained in a television broadcast signal and displaying a thumbnail image in parallel with a television image.

2. Description of the Related Art

In recent years, some television receivers are capable of displaying thumbnails obtained by reducing the size of photographs captured through a digital camera or recorded or distributed images.

The thumbnail images of the photographs or the like are displayed in the order in which they were recorded, for example, in a specified display area of a television receiver.

When a thumbnail image being displayed is selected with a cursor or the like, the photograph being displayed as the thumbnail is enlarged to a degree while being displayed on the television screen.

The thumbnail images may be displayed in parallel with a broadcast image contained in a television broadcast signal or a playback image.

The thumbnail images are displayed with the same brightness as the brightness of the normal broadcast image or playback image.

Japanese Unexamined Patent Application Publication No. 2005-303743 discloses a technique for playing a recorded video image (content).

According to the technique, images corresponding to the playing position of the recorded content are displayed chronologically, so that when a desired thumbnail image is selected, the recorded content starts being played from the playing position corresponding to the selected thumbnail image.

SUMMARY OF THE INVENTION

Since the thumbnail images are displayed in the order in which they were recorded, for example, in a specified display area of a television receiver as discussed above, however, it is difficult to display favorite photographs of a viewer (user), for example, as he/she desires.

Even in the case where only favorite photographs are registered for thumbnail display, the photographs are invariably displayed in the order in which they were recorded, which is far from displaying the photographs in the order of preference of the user and thus leaves an issue in terms of usability.

Since the thumbnail images are displayed with the same brightness as the brightness of the normal broadcast image or playback image being displayed in parallel with the thumbnail images, the thumbnail images may be so conspicuous that the broadcast or playback image may not be enjoyed.

That is, if the brightness of the thumbnail images on a side of the screen is so high, the thumbnail images may be conspicuous compared to the broadcast image or the playback image being displayed in the center of the screen as the main object to be viewed, which may hinder viewing the broadcast or playback image.

In the case where setting is made in the technique for playing a recorded video image discussed above such that the first image of a recorded drama or commercial message (CM) is displayed as a thumbnail image, the thumbnail image may indicate the title of the drama, the first image of the CM, or the CM itself.

This setting may be disadvantageous when a drama starred by a favorite actor or a soccer game in which a favorite player appears, for example, is to be recorded in the following respect.

It may be difficult for the user to determine whether or not the video image starred by his/her favorite actor, for example, was successfully recorded on the basis of the thumbnail image indicating the title of the drama or the CM.

Thus, there is a desire to display a thumbnail image in such an effective manner that matches the status of use.

It is therefore desirable to provide a display control device, a display control method, and a program capable of displaying a thumbnail image in such an effective manner that matches the status of use.

According to a first embodiment of the present invention, there is provided a display control device including: a reception section configured to receive a television broadcast signal; a display section configured to display video information and a thumbnail image contained in the television broadcast signal; and a control section configured to control display on the display section of the video information and the thumbnail image contained in the television broadcast signal received by the reception section, in which the control section causes the thumbnail image to be displayed in accordance with an order of priority.

Preferably, the control section determines the order of priority in accordance with the number of accesses.

Preferably, the control section causes the thumbnail image to be displayed in accordance with the order of priority determined in accordance with an order of preference.

Preferably, the control section causes a plurality of thumbnail images to be displayed in a preset display area in accordance with the order of priority.

Preferably, the control section forms a main display area in which the video image is to be displayed in the display section and a sub display area in which the thumbnail images are to be displayed in parallel with the main display area; and causes the thumbnail images to be displayed in the sub display area such that a thumbnail image with a higher order of priority is positioned closer to the main display area.

Preferably, the control section forms a main display area in which the video image is to be displayed in the display section and first and second sub display areas in which the thumbnail images are to be displayed in parallel with and on both sides of the main display area; and causes the thumbnail images to be displayed in at least one of the first and second sub display areas such that a thumbnail image with a higher order of priority is positioned closer to the main display area.

According to a second embodiment of the present invention, there is provided a display control method including the steps of: receiving a television broadcast signal; displaying video information contained in the received television broadcast signal on a display section; and displaying a thumbnail image in accordance with an order of priority on the display section on which the video information is being displayed.

According to a third embodiment of the present invention, there is provided a program for causing a computer to execute a display control process including the steps of: receiving a television broadcast signal through a reception section; displaying video information contained in the television broadcast signal on a display section; and displaying a thumbnail image in accordance with an order of priority on the display section on which the video information is being displayed.

According to the present invention, the reception section receives a television broadcast signal, and the display section displays a video image contained in the television broadcast signal.

The control section causes the display section to display a thumbnail image of a photograph or the like in parallel with the video image.

The control section causes the thumbnail image to be displayed in accordance with the order of priority.

According to the present invention, it is possible to display a thumbnail image in such an effective manner that matches the status of use.

BRIEF DESCRIPTION OF THE DRAWINGS

FIG. 7A is a first view illustrating a cursor setting operation of a cursor control function section according to the embodiment, showing a cursor in the initial state;

FIG. 7B is a first view illustrating the cursor setting operation of the cursor control function section according to the embodiment, showing a state where the cursor has been moved;

FIG. 11A is a front view showing an exemplary configuration of a remote controller according to the embodiment;

FIG. 11B is a side view showing an exemplary configuration of the remote controller according to the embodiment;

DESCRIPTION OF THE PREFERRED EMBODIMENTS

An embodiment of the present invention will be described below with reference to the drawings.

Figure 1:
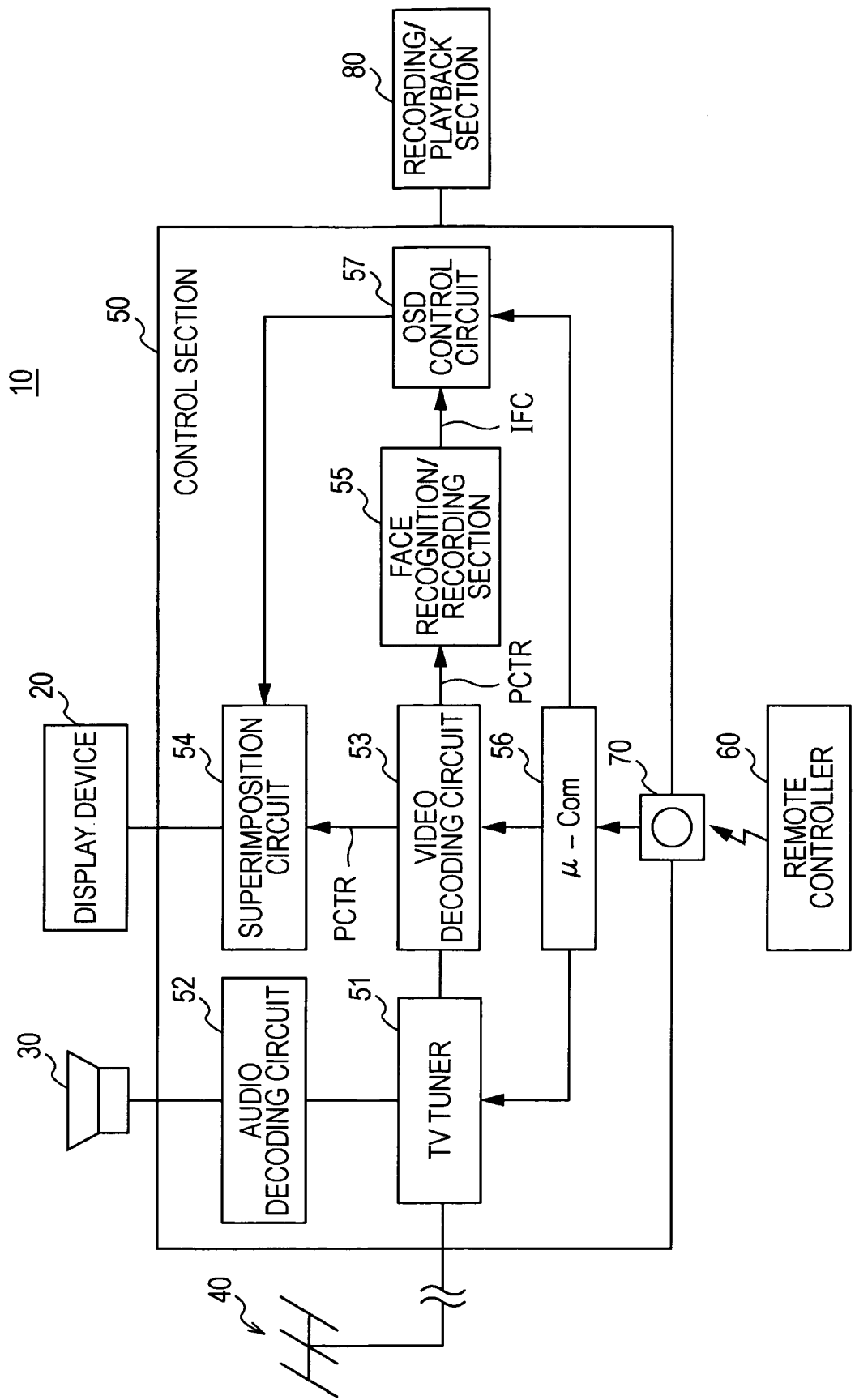
FIG. 1 is a block diagram showing an exemplary configuration of a display control device according to an embodiment of the present invention.

FIG. 1 is a block diagram showing an exemplary configuration of a display control device according to an embodiment of the present invention.

Figure 2:
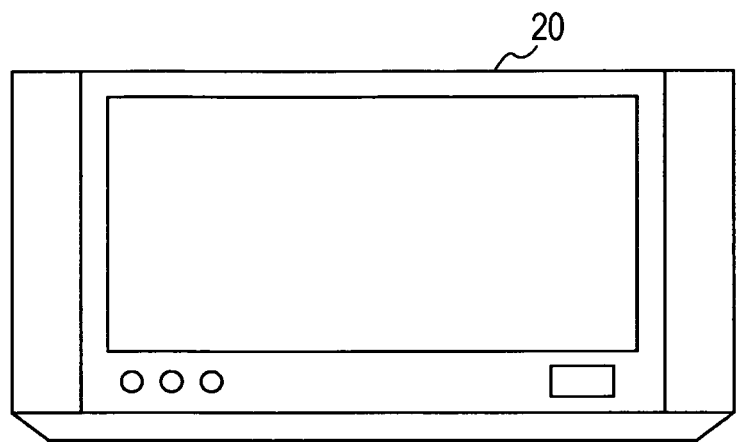
FIG. 2 shows the outline of a display device of the display control device according to the embodiment of the present invention.

FIG. 2 shows the outline of a display device of the display control device according to the embodiment of the present invention.

A display control device 10 according to the embodiment includes a display device 20, a speaker 30, a television (TV) antenna 40, a control section 50, a remote controller 60 serving as an operating section, a light reception section 70, and a recording/playback section 80.

The display device 20 serving as a display section is a thin display such as a liquid-crystal display device or an organic EL display device.

As shown in FIG. 2, the display device 20 has a wide aspect ratio. The aspect ratio of the display device 20 is set to 16:9, for example.

The speaker 30 is controlled by the control section 50 so as to produce sound on the basis of a television (TV) broadcast signal received by the control section 50.

The control section 50 receives a TV broadcast signal via the TV antenna 40, causes the speaker 30 to produce sound in accordance with the decoding results of an audio signal contained in the TV broadcast signal, and causes the display device 20 to display a broadcast image in accordance with the decoding results of the TV broadcast signal and for a channel selected by a viewer (user).

The control section 50 according to the embodiment has various functions described below.

The control section 50 has a function of controlling display on the display device 20 of video information and thumbnail images contained in the received TV broadcast signal.

The control section 50 has a function of causing the thumbnail images to be displayed in accordance with the order of priority.

The control section 50 has a function of determining the order of priority for displaying the thumbnail images in accordance with the number of accesses.

The control section 50 has a function of causing the thumbnail images to be displayed in accordance with the order of priority determined in accordance with the order of preference.

In this case, the control section 50 may have a function of initially applying to the thumbnail images the order of priority determined in accordance with the order of preference, and then reassigning to the thumbnail images the order of priority determined in accordance with the number of accesses when information on the number of accesses is accumulated for an amount corresponding to a threshold or more.

The control section 50 has a function of causing a plurality of thumbnail images to be displayed in a preset display area in accordance with the order of priority.

The control section 50 has a function of forming a main display area in which the video image is to be displayed in the display device 20 and a sub display area in which the thumbnail images are to be displayed in parallel with the main display area, and causing the thumbnail images to be displayed in the sub display area such that a thumbnail image with a higher order of priority is positioned closer to the main display area.

More specifically, the control section 50 has a function of forming a main display area in which the video image is to be displayed in the display device 20 and first and second sub display areas in which the thumbnail images are to be displayed in parallel with and on both sides of the main display area. The control section 50 additionally has a function of causing the thumbnail images to be displayed in at least one of the first and second sub display areas such that a thumbnail image with a higher order of priority is positioned closer to the main display area.

The control section 50 has a function of causing the thumbnail images to be displayed with a brightness lower than the brightness of the video information displayed on the main display area.

In this case, the control section 50 has a function of causing a part of the thumbnail images to be displayed with a higher brightness.

The control section 50 has a function of causing a thumbnail image selected with a cursor or the like to be displayed with a higher brightness. The control section 50 has a function of causing a selected thumbnail image to be displayed with a higher brightness in the case where a plurality of thumbnail images are displayed.

The control section 50 has a function of recording the received video information while performing a face recognition process.

The control section 50 has a function of substituting an image from which a face is recognized for a representative image of the recorded program as a thumbnail image of the program.

In this case, the control section 50 substitutes the first image from which the face of a face-recognition target specified in advance is recognized for the representative image as a thumbnail image.

The control section 50 has a function of causing an image of a face-recognition target specified in advance to be displayed as a thumbnail image in order to substitute an image obtained by performing face recognition on the video image being recorded for the thumbnail image.

The control section 50 has a function of when a thumbnail image which has been obtained through face recognition and substituted is selected, playing a video image which is recorded in the recording/playback section 80 and from which the thumbnail image has been obtained.

As shown in FIG. 1, the control section 50 having the various functions described above includes a TV tuner 51 and an audio decoding circuit 52.

The control section 50 further includes a video decoding circuit 53, a superimposition circuit 54, a face recognition/recording section 55, a microcomputer (μ-Com) 56, and an OSD (On Screen Display) control circuit 57.

The TV tuner 51 receives and demodulates a TV broadcast signal in a specified TV broadcast channel in accordance with a command from the microcomputer 56, and supplies an audio signal and a video signal to the audio decoding circuit 52 and the video decoding circuit 53, respectively.

The received broadcast signal is recorded in the recording/playback section 80 under control performed by the microcomputer 56, and the recorded information is played to be displayed on the display device 20.

The audio decoding circuit 52 decodes the audio signal, and outputs the decoded signal to the speaker 30.

The video decoding circuit 53 decodes the video signal under control performed by the microcomputer 56, and supplies the decoded signal PCTR to the superimposition circuit 54, the face recognition/recording section 55, and the OSD control circuit 57.

The superimposition circuit 54 superimposes a thumbnail image, a cursor, etc., as complementary information from the OSD control circuit 57 on the video signal PCTR from the video decoding circuit 53 for display on the display screen of the display device 20.

The superimposition circuit 54 causes the thumbnail image to be displayed in parallel with a playback image from the recording/playback section 80 in accordance with control performed by the OSD control circuit 57.

The face recognition/recording section 55 has a function of recording the received video information in the recording/playback section 80 while performing a face recognition process.

The face recognition/recording section 55 supplies face-recognition image information IFC obtained through face recognition to the OSD control circuit 57.

Figure 3:
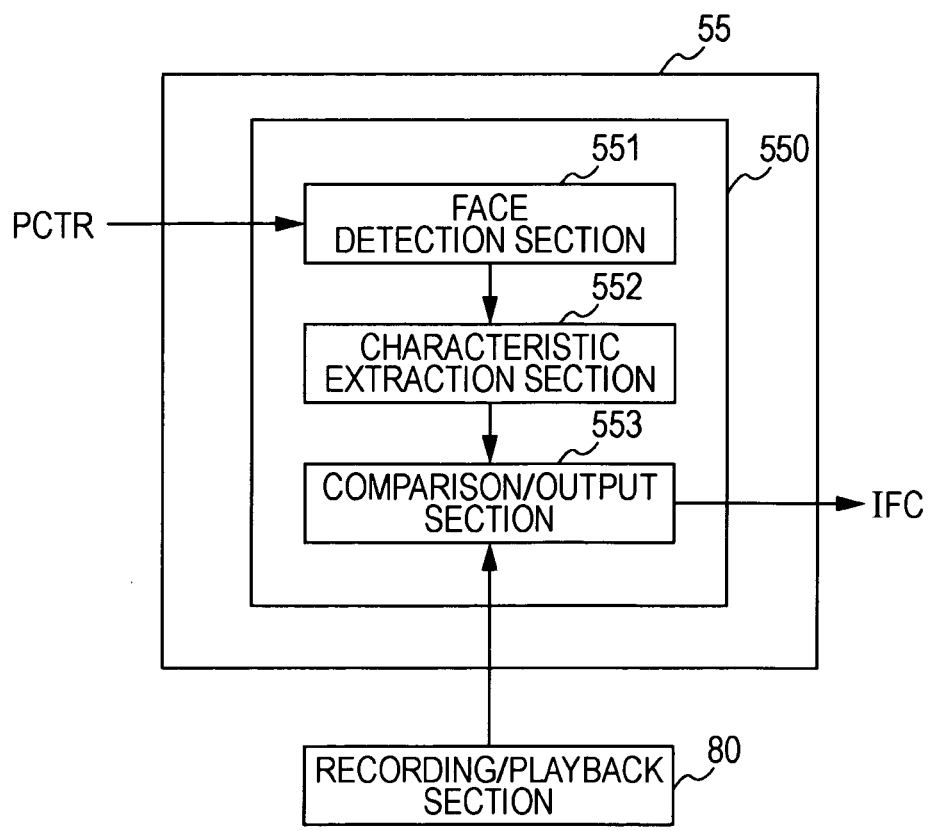
FIG. 3 is a block diagram showing an exemplary configuration of a face recognition/recording section according to the embodiment.

FIG. 3 is a block diagram showing an exemplary configuration of the face recognition/recording section 55 according to the embodiment.

As shown in FIG. 3, the face recognition/recording section 55 includes a face recognition section 550.

The face recognition section 550 includes a face detection section 551, a characteristic extraction section 552, and a comparison/output section 553.

The face detection section 551 detects a face image of a person as a recognition target (recognition target face image) from a movie content as the video signal PCTR from the video decoding circuit 53.

The face detection section 551 executes a detection process for detecting a face image of the person from the movie content for each frame of the movie content.

Upon detecting a face image of a new person in a frame in the detection process, the face detection section 551 executes a tracking process for tracking the face of the same person for that frame and subsequent frames.

The "tracking process" as used herein refers to a process for determining whether or not the face of the same person appears in a frame and subsequent frames, and repeatedly detecting the face of the same person as long as it is determined that the face of the person appears.

That is, the face detection section 511 repeatedly performs a tracking process for tracking the face of a new person each time a face image of a new person is detected from the movie content. Consequently, the face detection section 551 detects one or more time-series images containing one or more face images contained in a temporally continuous tracking range (a group of one or more temporally consecutive frames).

The characteristic extraction section 552 is an arithmetic processing unit, for example. The characteristic extraction section 552 sequentially reads data on the face images detected by the face detection section 551, and executes a process for contour extraction or the like to detect position data or the like on the facial features such as the eyes, the nose, and the mouth from the images.

The recording/playback section 80 as a database maintains the position data or the like on the features of each person specified as desired.

The comparison/output section 553 sequentially compares the position data on the features detected by the characteristic extraction section 552 with the corresponding position data registered in the recording/playback section 80 to determine whether or not the detected face matches a face registered in the recording/playback section 80.

If the detected face matches a registered face, the comparison/output section 553 supplies the face-recognition image information IFC obtained through the recognition to the OSD control circuit 57.

The microcomputer 56 performs various control operations of the control section 50 which functions as a TV receiver in correspondence with a command signal from the remote controller 60. The microcomputer 56 changes the channel, adjusts the volume, etc., in correspondence with a command signal from the remote controller 60.

The microcomputer 56 performs an analysis process on a signal input via the remote controller 60.

The microcomputer 56 outputs a command for forming various information such as a thumbnail image, a cursor, etc., as complementary information and a command for OSD display to the OSD control circuit 57 in accordance with the analysis results.

The OSD control circuit 57 generates various OSD video signals for displaying icons, letters, and symbols corresponding to the display screen in accordance with a command CMD from the microcomputer 56, and outputs the generated signal to the superimposition circuit 54.

The OSD control circuit 57 forms various information such as a thumbnail image, a cursor, etc., as complementary information in accordance with the command CMD from the microcomputer 56.

The OSD control circuit 57 outputs the formed OSD video signal to the superimposition circuit 54.

The video image contained in the OSD video signal is superimposed on the video image contained in the TV image signal from the video decoding circuit 53 by the superimposition circuit 54, and output to the display device 20.

The OSD control circuit 57 has a function of causing a broadcast image, a playback image, and a thumbnail image to be displayed in a predetermined area of the display area in accordance with the command CMD from the microcomputer 56 while a TV image is being displayed on the display device 20.

Figure 4:
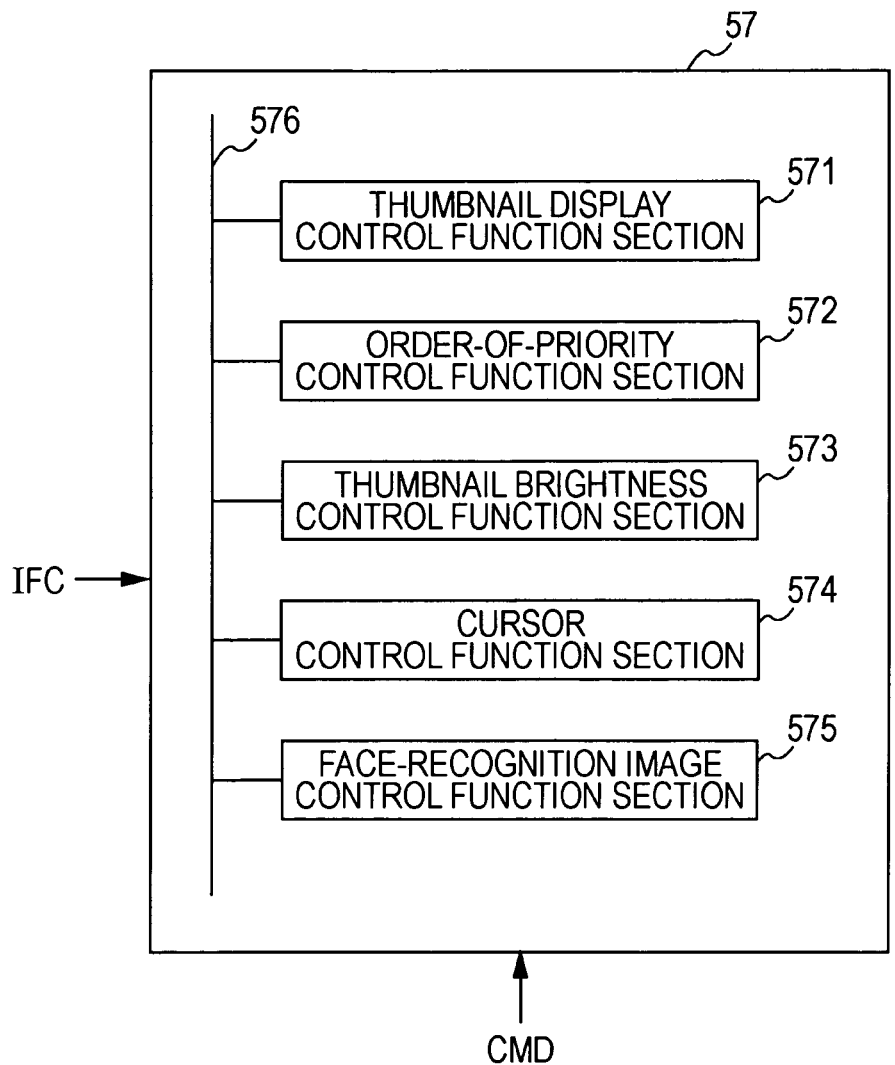
FIG. 4 is a functional block diagram showing a portion of an OSD control circuit according to the embodiment.

FIG. 4 is a functional block diagram showing a portion of the OSD control circuit 57 according to the embodiment.

As shown in FIG. 4, the OSD control circuit 57 includes a thumbnail display control function section 571, an order-of-priority control function section 572, a thumbnail brightness control function section 573, a cursor control function section 574, and a face-recognition image control function section 575.

The thumbnail display control function section 571, the order-of-priority control function section 572, the thumbnail brightness control function section 573, the cursor control function section 574, and the face-recognition image control function section 575 are connected to each other through a bus 576.

The thumbnail display control function section 571 has a function of causing the thumbnail images to be displayed in a predetermined sub display area of the display area in accordance with a thumbnail display command CMD from the microcomputer 56 while a TV image is being displayed on the display device 20, for example.

The thumbnail display function is activated in response to the thumbnail display command CMD issued by the microcomputer 56 when the user selects a thumbnail display command key with the remote controller 60, for example.

The order-of-priority control function section 572 causes the thumbnail images, which are to be displayed on the display device 20 by the thumbnail display control function section 571, to be displayed in accordance with the prescribed order of priority.

The order-of-priority control function section 572 causes the thumbnail images to be displayed in accordance with the order of priority determined in advance in accordance with the order of preference of the user.

The order-of-priority control function section 572 determines the order of priority for displaying the thumbnail images in accordance with the number of accesses.

In this case, the order-of-priority control function section 572 initially applies to the thumbnail images the order of priority determined in accordance with the order of preference, and then reassigns to the thumbnail images the order of priority determined in accordance with the number of accesses when information on the number of accesses is accumulated for an amount corresponding to a threshold or more.

The order-of-priority control function section 572 causes a plurality of thumbnail images to be displayed in a preset display area in accordance with the order of priority.

The thumbnail display control function section 571 forms a main display area in which the broadcast image is to be displayed in the center of the display device 20, and a sub display area in which the thumbnail images are to be displayed in parallel with the main display area.

Figure 5:
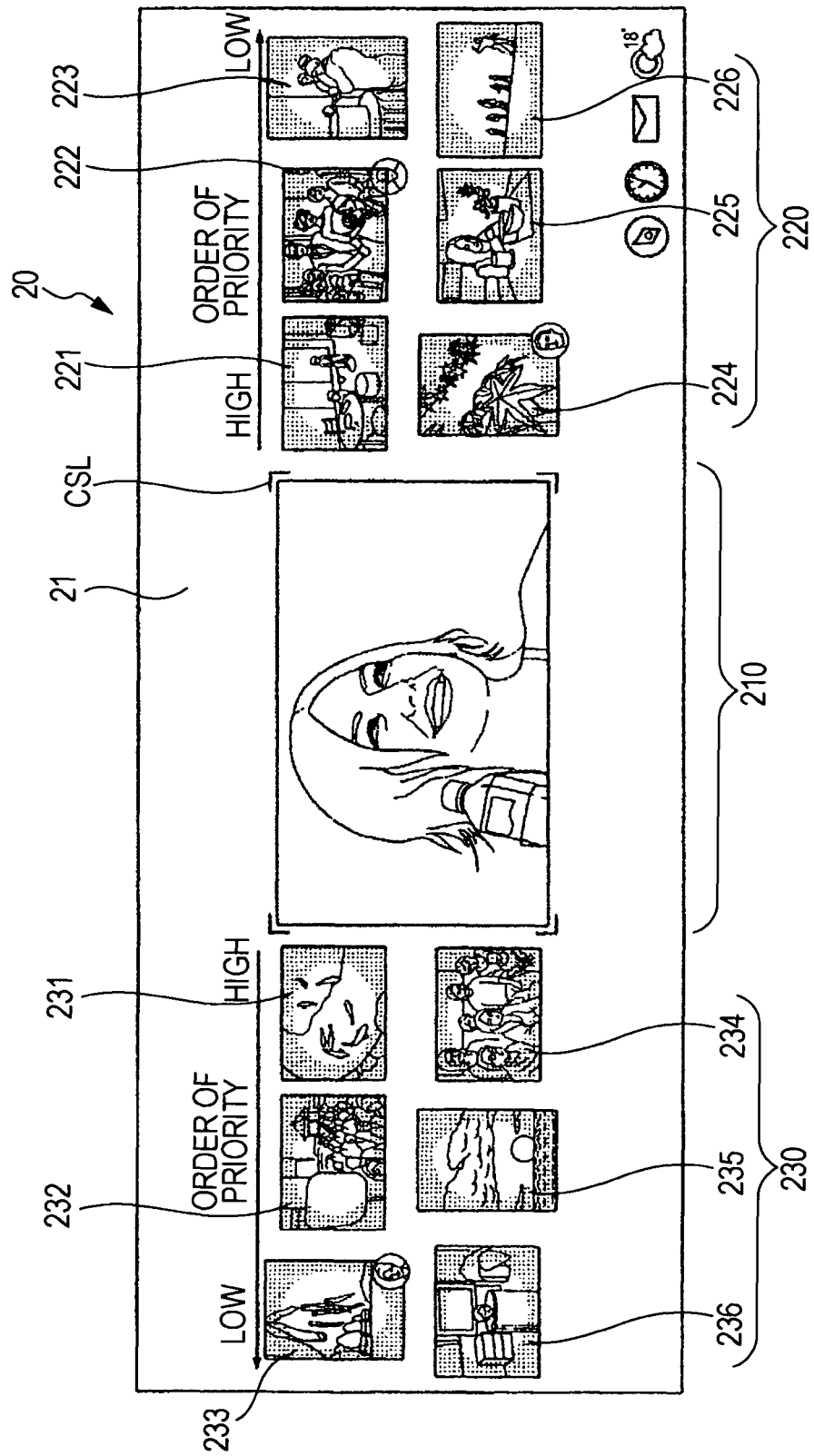
FIG. 5 shows an exemplary screen displayed on the display device with thumbnail display.

FIG. 5 shows an exemplary screen displayed on the display device 20 with thumbnail display.

In the example of FIG. 5, the thumbnail display control function section 571 forms a main display area 210 in which the video image is to be displayed in a display area 21 of the display device 20 and first and second sub display areas 220, 230 in which the thumbnail images are to be displayed in parallel with and on both sides of the main display area 210.

The thumbnail display control function section 571 causes the thumbnail images to be displayed in at least one of the first and second sub display areas 220, 230 such that a thumbnail image with a higher order of priority is positioned closer to the main display area 210.

In the example of FIG. 5, the broadcast image is displayed in the main display area 210, allowing channel selection while viewing the main display area 210.

Thumbnail images of various photographs are displayed in the first and second sub display areas 220, 230.

The thumbnail display control function section 571 defines sub display areas 221 to 226 of two rows and three columns in the first sub display area 220.

The thumbnail display control function section 571 causes a thumbnail image with the highest order of priority to be displayed in the sub display area 221 in the first row, for example, and in the first column that is closest to the main display area 210.

The thumbnail display control function section 571 causes a thumbnail image with the second highest order of priority to be displayed in the sub display area 222 in the first row, for example, and in the second column that is next to the sub display area 221 closest to the main display area 210.

The thumbnail display control function section 571 causes a thumbnail image with the third highest order of priority to be displayed in the sub display area 223 in the first row, for example, and in the third column that is farthest from the main display area 210.

Likewise, the thumbnail display control function section 571 causes a thumbnail image with the highest order of priority to be displayed in the sub display area 224 in the second row, for example, and in the first column that is closest to the main display area 210.

The thumbnail display control function section 571 causes a thumbnail image with the second highest order of priority to be displayed in the sub display area 225 in the second row, for example, and in the second column that is next to the sub display area 224 closest to the main display area 210.

The thumbnail display control function section 571 causes a thumbnail image with the third highest order of priority to be displayed in the sub display area 226 in the second row, for example, and in the third column that is farthest from the main display area 210.

Various forms of thumbnail display are thus possible. For example, it is possible to group the thumbnail images into thumbnail images of family photographs, thumbnail images of other photographs, etc., in order to display the thumbnail images in accordance with the order of priority for each group. It is also possible to display the thumbnail images in the sub display areas 221 to 226 simply in the order of priority.

The thumbnail display control function section 571 defines sub display areas 231 to 236 of two rows and three columns in the second sub display area 230.

The thumbnail display control function section 571 causes a thumbnail image with the highest order of priority to be displayed in the sub display area 231 in the first row, for example, and in the first column that is closest to the main display area 210.

The thumbnail display control function section 571 causes a thumbnail image with the second highest order of priority to be displayed in the sub display area 232 in the first row, for example, and in the second column that is next to the sub display area 231 closest to the main display area 210.

The thumbnail display control function section 571 causes a thumbnail image with the third highest order of priority to be displayed in the sub display area 233 in the first row, for example, and in the third column that is farthest from the main display area 210.

Likewise, the thumbnail display control function section 571 causes a thumbnail image with the highest order of priority to be displayed in the sub display area 234 in the second row, for example, and in the first column that is closest to the main display area 210.

The thumbnail display control function section 571 causes a thumbnail image with the second highest order of priority to be displayed in the sub display area 235 in the second row, for example, and in the second column that is next to the sub display area 234 closest to the main display area 210.

The thumbnail display control function section 571 causes a thumbnail image with the third highest order of priority to be displayed in the sub display area 236 in the second row, for example, and in the third column that is farthest from the main display area 210.

Also in this case, various forms of thumbnail display are possible. For example, it is possible to group the thumbnail images into thumbnail images of family photographs, thumbnail images of other photographs, etc., in order to display the thumbnail images in accordance with the order of priority for each group. It is also possible to display the thumbnail images in the sub display areas 231 to 236 simply in the order of priority.

The thumbnail brightness control function section 573 reduces the brightness of the thumbnail images displayed by the thumbnail display control function section 571 along with the broadcast image so that the thumbnail images (e.g. photographs) around the broadcast image in the main display area 210 in the center are less conspicuous than the broadcast image.

Figure 6A:
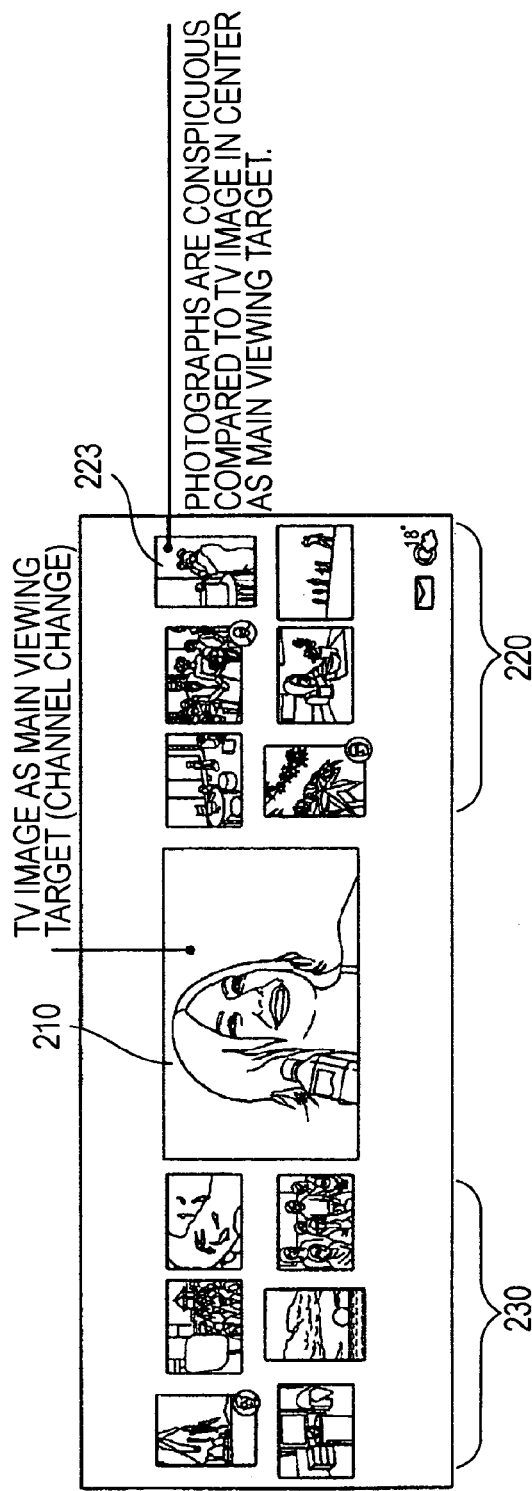
FIG. 6A shows an exemplary screen with thumbnail display, showing a state before brightness adjustment.
Figure 6B:
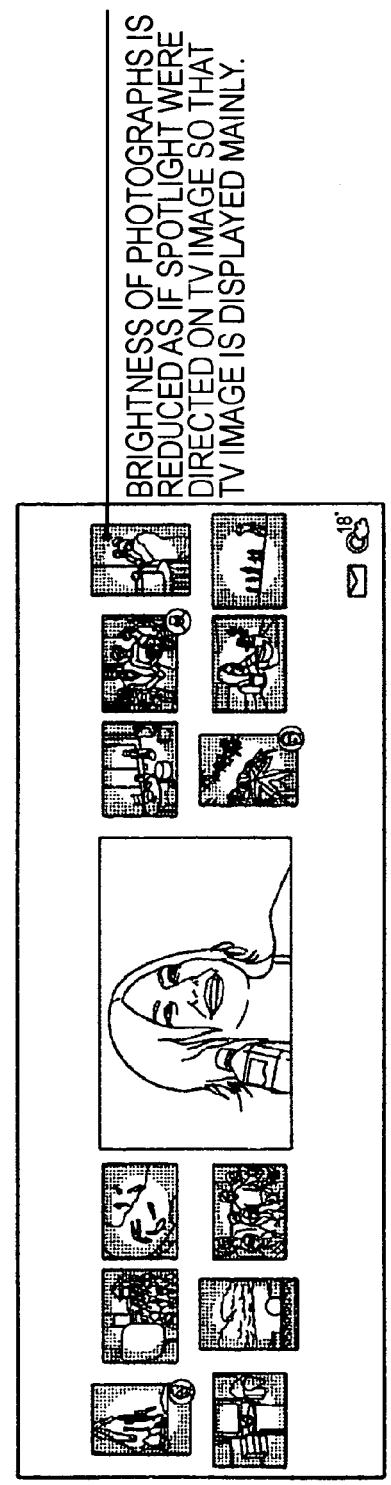
FIG. 6B shows an exemplary screen with thumbnail display, showing a state after brightness adjustment.

FIGS. 6A and 6B show an exemplary screen with thumbnail display, showing a state before and after brightness adjustment, respectively.

In FIG. 6A, for example, while the main display area 210 in the center should be displayed mainly, a thumbnail image displayed in the sub display area 223 of the first sub display area 220 is too bright and hence too conspicuous.

In the embodiment, as shown in FIG. 6B, the thumbnail image in the sub display area 223 is thus displayed with its brightness reduced to be lower than the brightness of the video information displayed in the main display area 210.

In this example, the thumbnail images around the main display area 210 in the center are displayed with a reduced brightness, as if a spotlight were directed on the main display area 210, so as to be less conspicuous than the main display area 210.

Figure 8:
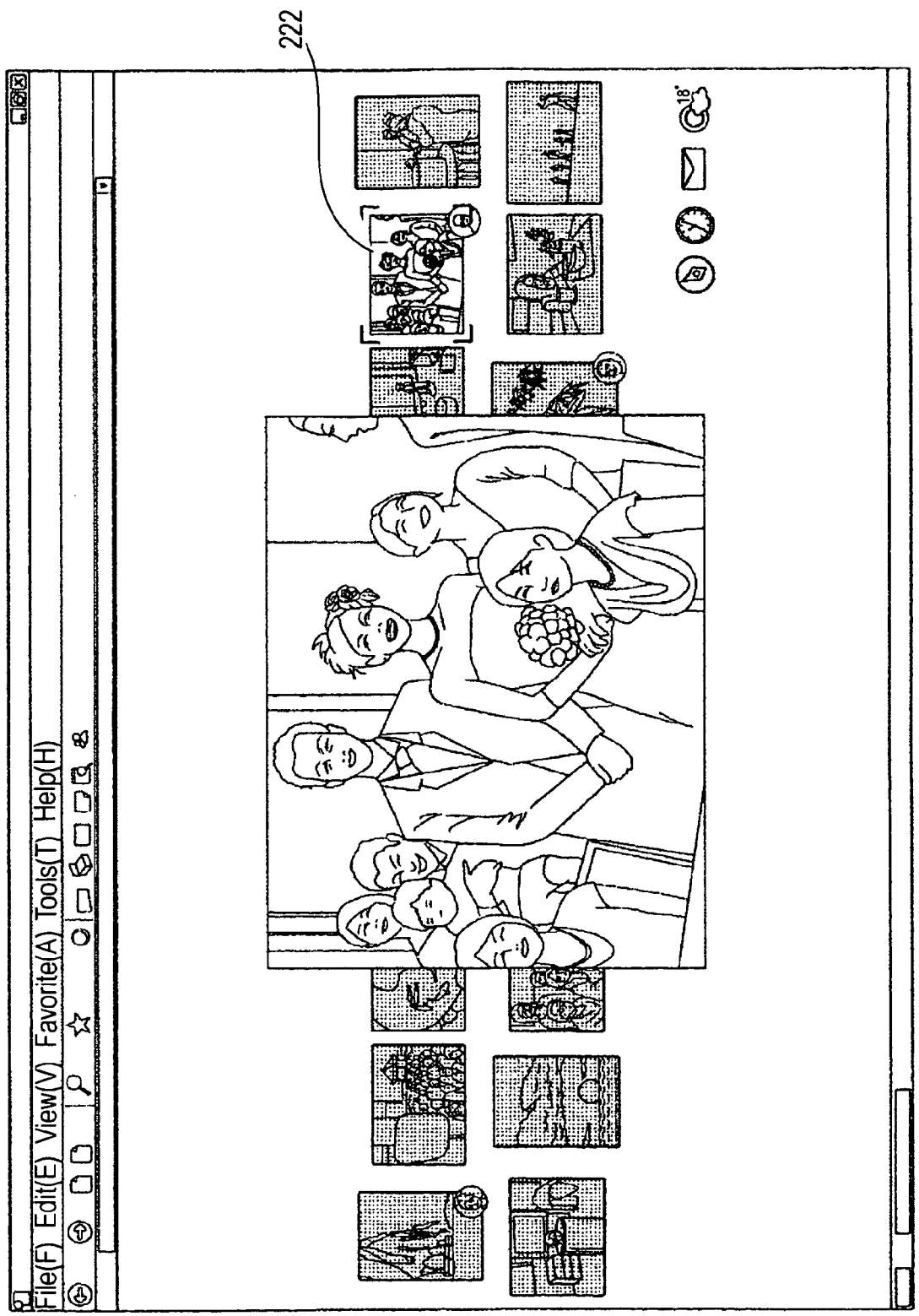
FIG. 8 is a second view illustrating the cursor setting operation of the cursor control function section according to the embodiment.

FIGS. 7A, 7B, and 8 illustrate a cursor setting operation of the cursor control function section 574 according to the embodiment.

When the thumbnail display control function section 57 performs thumbnail display as shown in FIG. 5, the cursor control function section 574 initially positions a cursor CSL so as to surround the main display area 210 in the center as shown in FIG. 7A.

After the cursor CSL is positioned at the main display area 210, the cursor control function section 574 moves the cursor CSL in the direction indicated by a movement command CMD issued from the microcomputer 56 in response to an upward, downward, leftward, or rightward operation of a movement command switch of the remote controller 60.

At this time, only a thumbnail image in a sub display area to which the cursor CSL has been moved is displayed with an increased brightness with the brightness of the main display area 210 in the center reduced.

When the cursor CSL is moved to the sub display area 222 of the first sub display area 220, for example, and a determination key of the remote controller 60 is operated, the following process is performed.

When the determination key is operated, the thumbnail display control function section 571 causes a thumbnail image selected with the determination key to be displayed as enlarged over the main display area 210 in the center as shown in FIG. 8.

The thumbnail display control function section 571 causes a thumbnail image selected with the cursor CSL to be displayed with an increased brightness.

The face-recognition image control function section 575 receives the face-recognition image information IFC supplied from the face recognition/recording section 55, and substitutes an image from which a face is recognized for a representative image of the recorded program as a thumbnail image of the recorded program.

The face-recognition image control function section 575 substitutes the first image from which the face of a face-recognition target specified in advance is recognized for the representative image as a thumbnail image.

The face-recognition image control function section 575 causes an image of a face-recognition target specified in advance to be displayed as a thumbnail image in order to substitute an image obtained by performing face recognition on the video image being recorded for the thumbnail image.

When a thumbnail image which has been obtained through face recognition and substituted is selected, the face-recognition image control function section 575 plays a video image which is recorded in the recording/playback section 80 and from which the thumbnail image has been obtained.

Figure 9:
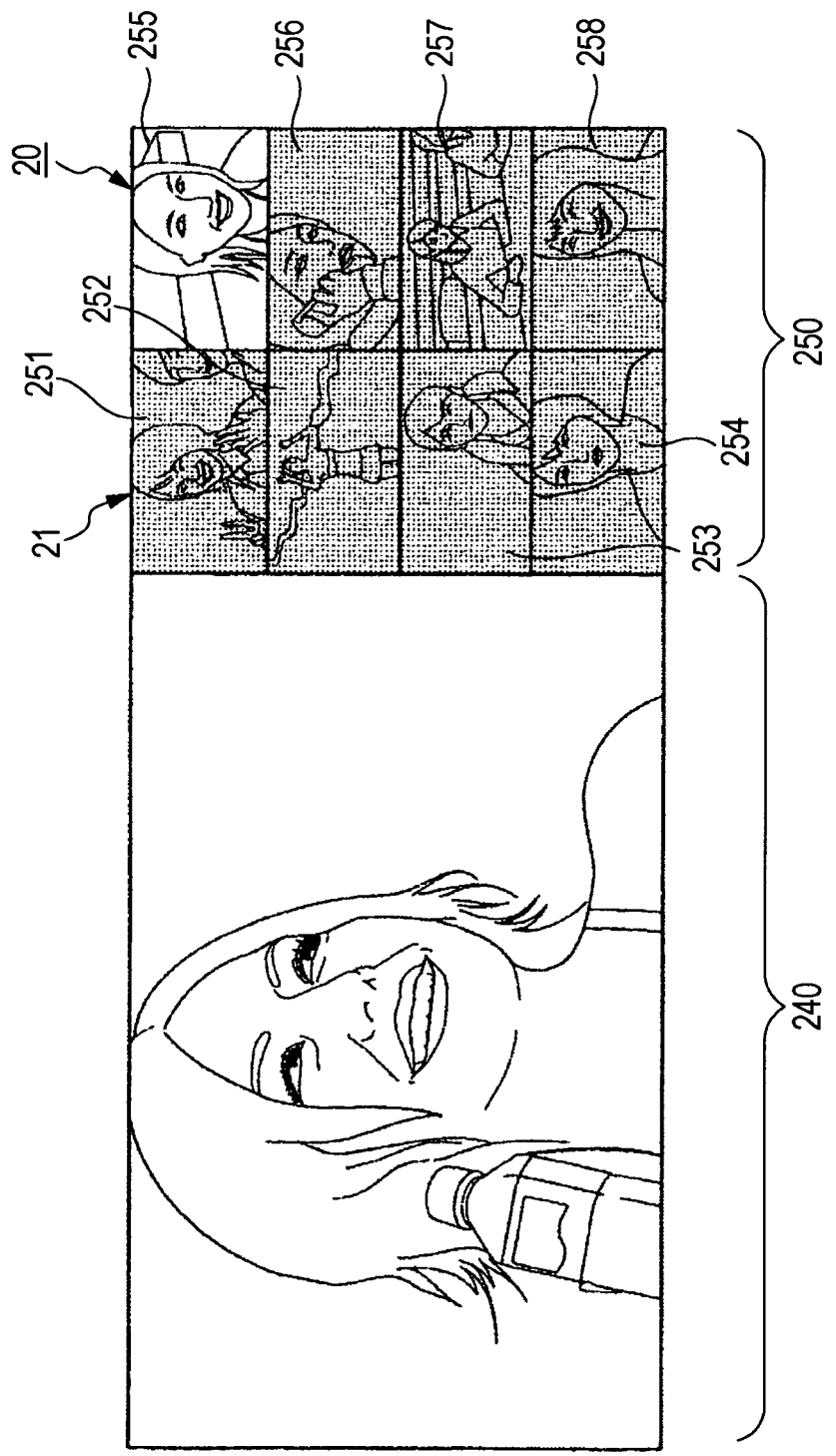
FIG. 9 shows an exemplary video image display screen on the display device formed by a face-recognition image control function section.

FIG. 9 shows an exemplary video image display screen on the display device 20 formed by the face-recognition image control function section 575.

The face-recognition image control function section 575 forms a video playback area 240 and a sub display area 250 in the display area 21 of the display device 20.

The video playback area 240 is formed to occupy about three- to four-fifths the size of the display area 21. A video image recorded in the recording/playback section 80 is played to be displayed in the video playback area 240.

Eight thumbnail display areas 251 to 258 are formed in the thumbnail display area 250. Images of a face-recognition target specified in advance are displayed in the thumbnail display areas 251 to 258 as thumbnail images.

The face-recognition image control function section 575 causes an image of a face-recognition target specified in advance to be displayed as a thumbnail image in order to substitute an image obtained by performing face recognition on the video image being recorded for the thumbnail image.

Figure 10A:
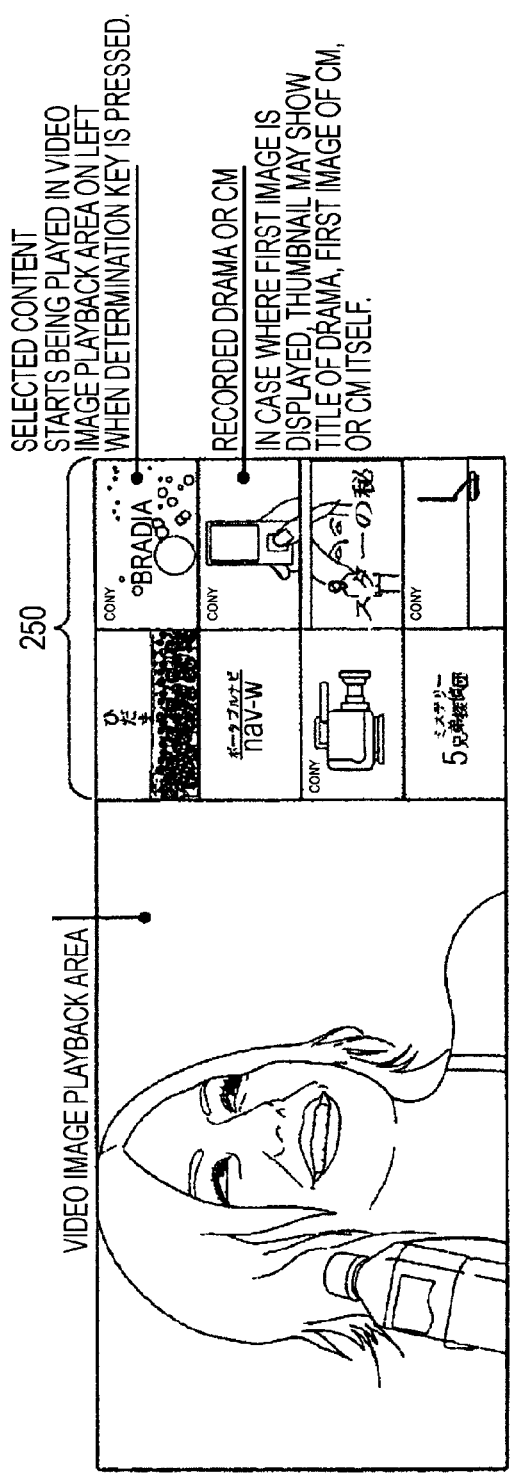
FIG. 10A illustrates the reason that a program is recorded with face recognition and that the first image obtained through the face recognition is substituted for a representative image of the program as a thumbnail of the program, showing a state where the first image of a recorded video image is displayed as a thumbnail image.
Figure 10B:
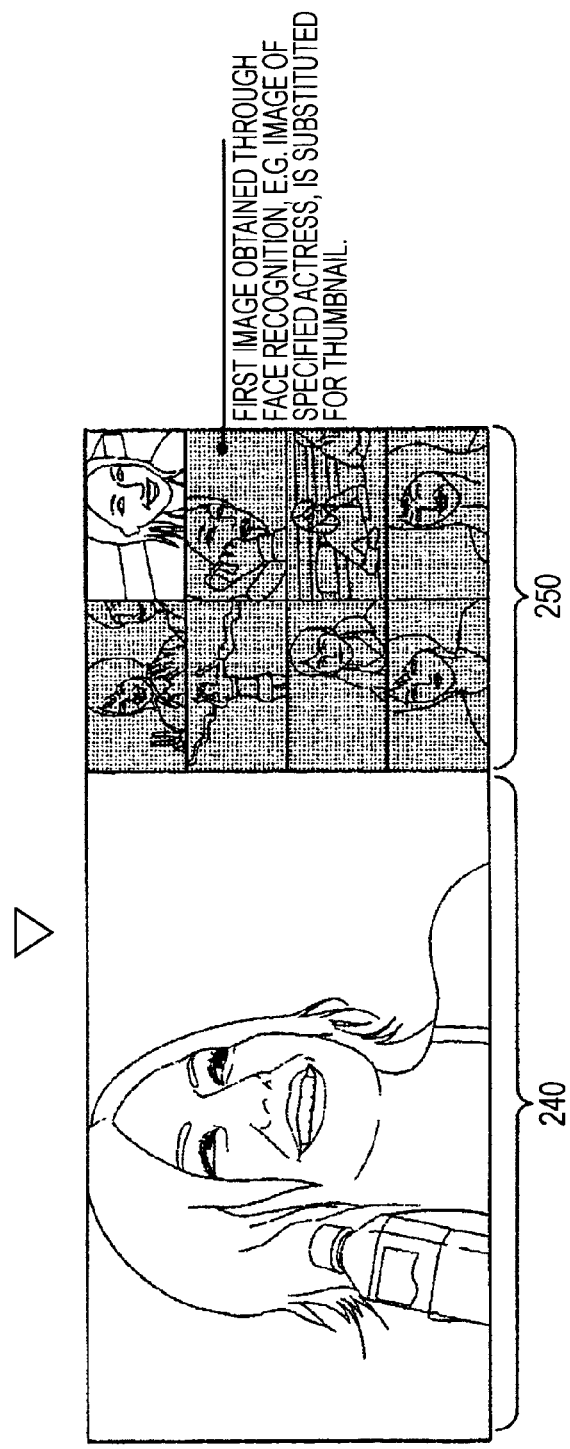
FIG. 10B illustrates the reason that a program is recorded with face recognition and that the first image obtained through the face recognition is substituted for a representative image of the program as a thumbnail of the program, showing a state where an image of a face-recognition target specified in advance is displayed as a thumbnail image.

FIGS. 10A and 10B illustrate the reason that a program is recorded with face recognition and that the first image obtained through the face recognition is substituted for a representative image of the program as a thumbnail of the program.

In the case where setting is made such that the first image of a recorded drama or commercial message (CM) is displayed as a thumbnail image, the thumbnail image may indicate the title of the drama, the first image of the CM, or the CM itself as shown in FIG. 10A.

This setting may be disadvantageous when a drama starred by a favorite actor or a soccer game in which a favorite player appears, for example, is to be recorded in the following respect.

It may be difficult for the user to determine whether or not the video image starred by his/her favorite actor, for example, was successfully recorded on the basis of the thumbnail image indicating the title of the drama or the CM.

In the embodiment, thus, a program is recorded with face recognition, and the first image obtained through the face recognition is substituted for a representative image of the program as a thumbnail of the program as shown in FIG. 10B, in order that a thumbnail image is displayed in such an effective manner that matches the status of use.

This makes it easy to confirm that a program in which a desired person appears has been successfully recorded.

The remote controller 60 has a function of transmitting a command for selecting the channel, a command regarding various display control for a ball game or the like, etc., to the microcomputer 56 of the control section 50 wirelessly via infrared light or the like.

When the user operates the remote controller 60, an infrared command signal for commanding various operation of the control section 50, which functions as a TV receiver, corresponding to the operation is input to the light reception section 70, converted into an electrical signal, and in turn input to the microcomputer 56.

In the case where the command signal from the remote controller 60 is to select a predetermined TV broadcast station, the microcomputer 56 outputs a channel selection command corresponding to the command signal to the TV tuner 51.

In the case where the command signal from the remote controller 60 is to perform various display control for a ball game or the like, the microcomputer 56 outputs a command CMD corresponding to the command signal to the OSD control circuit 57.

FIGS. 11A and 11B show an exemplary configuration of the remote controller 60 according to the embodiment. FIGS. 11A and 11B show a front view and a side view, respectively, of the remote controller 60.

The remote controller 60 includes a power switch 61, a channel up/down switch 62, and a volume up/down switch 63.

The power switch 61 is operated to turn on and off the TV receiver.

The channel up/down switch 62 is operated to tune to a TV broadcast channel next (or previous) to the currently selected channel.

The volume up/down switch 63 is operated to increase (or reduce) the volume of the audio output.

Numeric keys (not shown) are arranged in the remote controller 60. The numeric keys are operated to tune to a TV broadcast station, for example, corresponding to the number of an operated key.

The remote controller 60 further includes a cross stick switch section 64, a first function on/off switch 65 for a thumbnail image display function, and a second function on/off switch 66 for a recording function.

The cross stick switch section 64 includes a surrounding ring part 641 and a push button 642 in the center.

The ring part 641 are divided into four switch portions that respectively function as up, down, left, and right keys for commanding the cursor CSL to move upward, downward, leftward, and rightward.

The push button 642 may be used as a determination key for causing a thumbnail image selected with the cursor CSL to be selectively displayed.

The recording/playback section 80 records a received video image through the face recognition/recording section 55.

The recording/playback section 80 plays a recorded video image in accordance with a command from the OSD control circuit 57.

The recording/playback section 80 as a database stores information on a person as a face-recognition target such as the face, name, etc., of a favorite actor, athlete, etc. registered in advance.

The operation of the display control device 10 according to the embodiment is now described with reference to the flowcharts of FIGS. 12 to 14.

Figure 12:
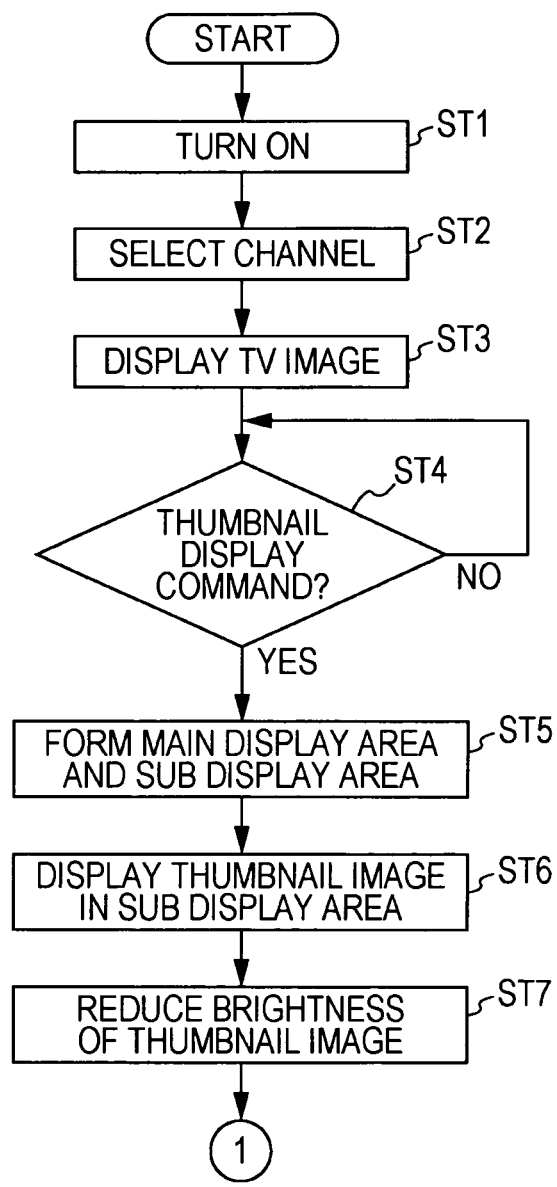
FIG. 12 is a first flowchart showing operation of the display control device according to the embodiment.

As shown in FIG. 12, the user operates the power switch 61 of the remote controller 60 to turn on the display control device 10 (ST1), and then operates the numeric keys or the channel up/down switch 62 to select a predetermined TV broadcast channel (ST2).

A command signal from the remote controller 60 is thus input to the microcomputer 56 via the light reception section 70 arranged in the control section 50.

In response to the input command signal, the microcomputer 56 outputs a channel selection command for the specified TV broadcast channel in which a soccer game, for example, is broadcast to the TV tuner 51. In response to the channel selection command, the TV tuner 51 selects the predetermined TV broadcast channel to output an audio signal and a video signal to the audio decoding circuit 52 and the video decoding circuit 53, respectively.

The video signal is decoded by the video decoding circuit 53, and then displayed on the display device 20 via the superimposition circuit 54. The audio decoding circuit 52 decodes the audio signal, and outputs the decoded signal to the speaker 30.

As described above, a TV image of the soccer game is displayed on the display device 20 (ST3), and a TV audio signal is output from the speaker 30.

The video signal PCTR decoded by the video decoding circuit 53 is supplied to the face recognition/recording section 55.

If the user operates the first function on/off switch 65 of the remote controller 60 to issue a thumbnail display command, for example, the thumbnail display control function section 571 performs the following processes.

The thumbnail display control function section 571 forms a main display area 210 in which the video image is to be displayed in the center of the display area 21 of the display device 20 in accordance with the thumbnail display command CMD from the microcomputer 56. —{ }—The thumbnail display control function section 571 then forms first and second sub display areas 220, 230 in which the thumbnail images are to be displayed in parallel with and on both sides of the main display area 210 (ST5).

Then, the order-of-priority control function section 572 causes the thumbnail images, which are to be displayed on the display device 20 by the thumbnail display control function section 571, to be displayed in accordance with the prescribed order of priority (ST6).

The thumbnail brightness control function section 573 reduces the brightness of the thumbnail images displayed by the thumbnail display control function section 571 along with the broadcast image so that the thumbnail images (e.g. photographs) around the broadcast image in the main display area 210 in the center are less conspicuous than the broadcast image (ST7).

The thumbnail images are displayed with a reduced brightness irrespective of whether or not the thumbnail images are displayed in accordance with the order of priority.

Figure 13:
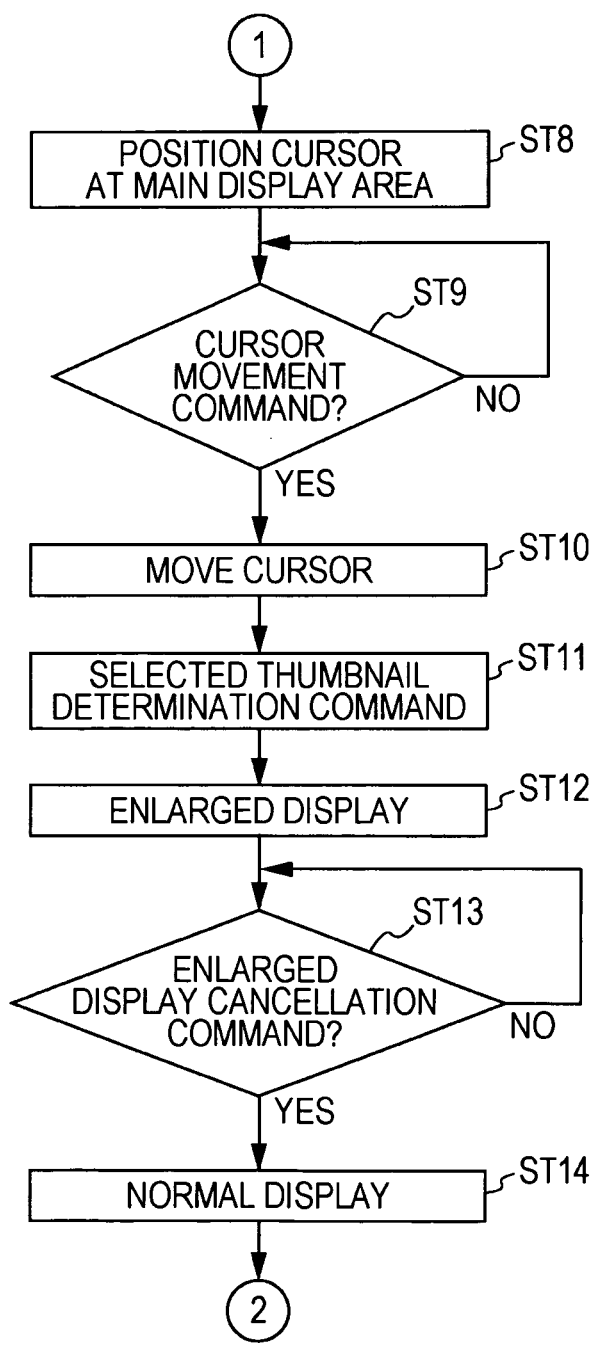
FIG. 13 is a second flowchart showing the operation of the display control device according to the embodiment.
Figure 14:
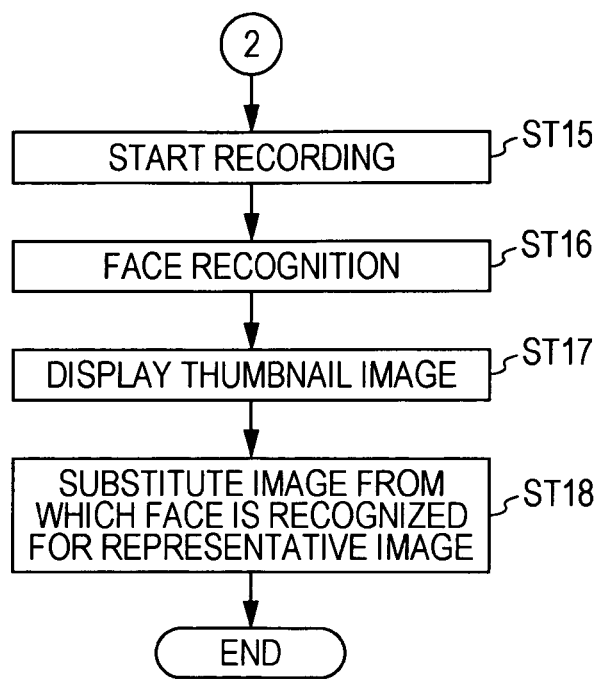
FIG. 14 is a third flowchart showing the operation of the display control device according to the embodiment.

As shown in FIG. 13, when the thumbnail images are displayed, the cursor control function section 574 positions the cursor CSL at the main display area 210 (ST8).

If the user commands to move the cursor CSL with the up, down, left, and right keys of the remote controller 60, a movement command CMD from the microcomputer 56 is input to the OSD control circuit 57 (ST9).

Consequently, the cursor control function section 574 moves the cursor CSL in the direction indicated by the movement command CMD issued from the microcomputer 56 in response to an upward, downward, leftward, or rightward operation of a movement command switch of the remote controller 60 through the superimposition circuit 54 (ST10).

If the user commands to determine the selection with the push button 642 of the cross stick switch section 64 of the remote controller 60, an enlarged display command CMD from the microcomputer 56 is input to the OSD control circuit 57 (ST11).

Consequently, the cursor control function section 574 causes a thumbnail image selected with the cursor CSL in accordance with the enlarged display command CMD from the microcomputer 56 to be displayed as enlarged in accordance with an operation of a zoom switch of the remote controller 60 through the superimposition circuit 54 (ST12).

Then, a thumbnail image selected with the determination key is displayed as enlarged over the main display area 210 in the center as shown in FIG. 8.

If the user issues an enlarged display cancellation command through the remote controller 60, an enlarged display cancellation command CMD from the microcomputer 56 is input to the OSD control circuit 57 (ST13).

Upon receiving the enlarged display cancellation command CMD from the microcomputer 56, the cursor control function section 574 stops the enlarged display of the thumbnail image, and switches the main display area 210 to normal display of the video image (ST14).

When the user operates the second function on/off switch 66 for a recording function, for example, a broadcast image starts being recorded (ST15).

When recording is started, the face recognition/recording section 55 records the received video information in the recording/playback section 80 while performing a face recognition process (ST16).

The face recognition/recording section 55 supplies face-recognition image information IFC obtained through face recognition to the OSD control circuit 57.

The face-recognition image control function section 575 of the OSD control circuit 57 forms a video playback area 240 and a sub display area 250 in the display area 21 of the display device 20.

The video playback area 240 is formed to occupy about three- to four-fifths the size of the display area 21. A video image recorded in the recording/playback section 80 is played to be displayed in the video playback area 240.

Eight thumbnail display areas 251 to 258, for example, are formed in the thumbnail display area 250. Images of a face-recognition target specified in advance are displayed in the thumbnail display areas 251 to 258 as thumbnail images (ST17).

The face-recognition image control function section 575 of the OSD control circuit 57 receives the face-recognition image information IFC supplied from the face recognition/recording section 55, and substitutes an image from which a face is recognized for a representative image of the recorded program as a thumbnail image of the program (ST18).

The face-recognition image control function section 575 substitutes the first image from which the face of a face-recognition target specified in advance is recognized for the representative image as a thumbnail image. The face-recognition image control function section 575 causes an image of a face-recognition target specified in advance to be displayed as a thumbnail image in order to substitute an image obtained by performing face recognition on the video image being recorded for the thumbnail image.

When a thumbnail image which has been obtained through face recognition and substituted is selected, the face-recognition image control function section 575 plays a video image which is recorded in the recording/playback section 80 and from which the thumbnail image has been obtained.

As described above, the control section 50 according to the embodiment has various functions described below.

The control section 50 has a function of controlling display on the display device 20 of video information and thumbnail images contained in the received TV broadcast signal.

The control section 50 has a function of causing the thumbnail images to be displayed in accordance with the order of priority.

The control section 50 has a function of determining the order of priority for displaying the thumbnail images in accordance with the number of accesses.

The control section 50 has a function of causing the thumbnail images to be displayed in accordance with the order of priority determined in accordance with the order of preference.

In this case, the control section 50 may have a function of initially applying to the thumbnail images the order of priority determined in accordance with the order of preference, and then reassigning to the thumbnail images the order of priority determined in accordance with the number of accesses when information on the number of accesses is accumulated for an amount corresponding to a threshold or more.

The control section 50 has a function of causing a plurality of thumbnail images to be displayed in a preset display area in accordance with the order of priority.

According to the embodiment, it is thus possible to display favorite photographs of a viewer (user), for example, as he/she desires.

That is, according to the embodiment, it is possible to display thumbnail images in the order of preference of the user, which is advantageous in terms of usability.

The control section 50 has a function of causing the thumbnail images to be displayed with a brightness lower than the brightness of the video information displayed on the main display area.

In this case, the control section 50 has a function of causing a part of the thumbnail images to be displayed with a higher brightness.

The control section 50 has a function of causing a thumbnail image selected with a cursor or the like to be displayed with a higher brightness. The control section 50 has a function of causing a selected thumbnail image to be displayed with a higher brightness in the case where a plurality of thumbnail images are displayed.

According to the embodiment, the thumbnail images are displayed with a brightness lower than the brightness of the normal broadcast image or playback image being displayed in parallel with the thumbnail images. It is thus possible to prevent the thumbnail images from being so conspicuous that the broadcast or playback image may not be enjoyed.

That is, it is possible to prevent the thumbnail images on a side of the screen from being conspicuous compared to the broadcast image in the center as the main object to be viewed, reducing the possibility that viewing of the video image is hindered.

The control section 50 has a function of recording the received video information while performing a face recognition process.

The control section 50 has a function of substituting an image from which a face is recognized for a representative image of the recorded program as a thumbnail image of the program.

In this case, the control section 50 substitutes the first image from which the face of a face-recognition target specified in advance is recognized for the representative image as a thumbnail image.

The control section 50 has a function of causing an image of a face-recognition target specified in advance to be displayed as a thumbnail image in order to substitute an image obtained by performing face recognition on the video image being recorded for the thumbnail image.

The control section 50 has a function of when a thumbnail image which has been obtained through face recognition and substituted is selected, playing a video image which is recorded in the recording/playback section 80 and from which the thumbnail image has been obtained.

According to the embodiment, it is thus easy for the user to determine whether or not the video image starred by his/her favorite actor, for example, was successfully recorded on the basis of the thumbnail image which does not indicate the title of the drama or the CM.

The method described in detail above may be implemented as a program that includes procedures corresponding to the steps described above and that is executable by a computer such as a CPU.

Such a program may be stored in a storage medium such as a semiconductor memory, a magnetic disk, an optical disk, a floppy (registered trademark) disk so as to be accessed and executed by a computer into which the storage medium is loaded.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:
a reception section configured to receive a television broadcast signal;
a display section configured to display video information and a thumbnail image contained in the television broadcast signal; and
a control section configured to control display on the display section of the video information and the thumbnail image contained in the television broadcast signal received by the reception section,
wherein the control section causes a plurality of thumbnail images to be displayed in accordance with an order of priority,
wherein the control section
forms a main display area in which a video image of the video information is to be displayed in the display section and a sub display area in which thumbnail images are to be displayed in parallel with the main display area,
causes the thumbnail images to be displayed in the sub display area such that an order of priority of a thumbnail image is increasing from a position in the sub display area farthest from the main display area to a position in the sub display area closest to the main display area,
reassigns to the thumbnails to be displayed in the sub display area having the order of priority determined in accordance with an order of preference of a user the order of priority determined in accordance with a number of accesses, and
in response to detecting a selected one of the thumbnail images in the sub display area, causes an enlarged version of the selected thumbnail image to be displayed in the main display area in place of the video image, wherein the thumbnail images remain displayed in the sub display area.

2. The display control device according to claim 1, wherein the control section causes the thumbnail image to be displayed in accordance with the order of priority determined in accordance with an order of preference.

3. The display control device according to claim 2, wherein the control section causes a plurality of thumbnail images to be displayed in a preset display area in accordance with the order of priority.

4. The display control device according to claim 3, wherein the control section
forms first and second sub display areas in which the thumbnail images are to be displayed in parallel with and on both sides of the main display area; and
causes the thumbnail images to be displayed in at least one of the first and second sub display areas such that a thumbnail image with a higher order of priority is positioned closer to the main display area.

5. A display control method comprising the steps of:
receiving a television broadcast signal;
displaying video information contained in the received television broadcast signal on a display section;

displaying a thumbnail image in accordance with an order of priority on the display section on which the video information is being displayed, wherein a main display area in which a video image of the video information is to be displayed is formed in the display section and a sub display area in which thumbnail images are to be displayed are formed in parallel with the main display area, wherein the thumbnail images are displayed in the sub display are such that an order of priority of a thumbnail image is increasing from a position in the sub display area farthest from the main display area to a position in the sub display area closest to the main display area, wherein the thumbnails displayed in the sub display area having the order of priority determined in accordance with an order of preference of a user are reassigned the order of priority determined in accordance with a number of accesses; and in response to detecting a selected one of the thumbnail images in the sub display area, causing an enlarged version of the selected thumbnail image to be displayed in the main display area in place of the video image, wherein the thumbnail images remain displayed in the sub display area.

6. The display control method according to claim 5, wherein
a plurality of thumbnail images are displayed in a preset display area in accordance with the order of priority.

7. The display control method according to claim 6, wherein
a first and second sub display areas in which the thumbnail images are to be displayed are formed in parallel with and on both sides of the main display area; and
the thumbnail images are displayed in at least one of the first and second sub display areas such that a thumbnail image with a higher order of priority is positioned closer to the main display area.

8. A non-transitory storage medium on which is recorded a program for causing a computer to execute a display control process comprising the steps of:
receiving a television broadcast signal through a reception section;
displaying video information contained in the television broadcast signal on a display section;
displaying a thumbnail image in accordance with an order of priority on the display section on which the video information is being displayed, wherein a main display area in which a video image of the video information is to be displayed is formed in the display section and a sub display area in which thumbnail images are to be displayed are formed in parallel with the main display area, wherein the thumbnail images are displayed in the sub display area such that an order of priority of a thumbnail image is increasing from a position in the sub display area farthest from the main display area to a position in the sub display area closest to the main display area, and wherein the thumbnails displayed in the sub display area having the order of priority determined in accordance with an order of preference of a user are reassigned the order of priority determined in accordance with a number of accesses; and in response to detecting a selected one of the thumbnail images in the sub display area, causing an enlarged version of the selected thumbnail image to be displayed in the main display area in place of the video image, wherein the thumbnail images remain displayed in the sub display area.

9. The display control device of claim 1, wherein the control section causes the thumbnail images in the sub display area to be displayed with a display appearance different from a display appearance of the main display area.

10. The display control device of claim 9, wherein the display appearance is brightness.

11. The display control method of claim 5, wherein the control section causes the thumbnail images in the sub display area to be displayed with a display appearance different from a display appearance of the main display area.

12. The display control method of claim 11, wherein the display appearance is brightness.

13. The display control device of claim 1, wherein the thumbnail image is an image of the video information from which a face is recognized.

14. The display control method of claim 5, wherein the thumbnail image is an image of the video information from which a face is recognized.

* * * * *

UNITED STATES PATENT AND TRADEMARK OFFICE
CERTIFICATE OF CORRECTION

PATENT NO. : 8,484,682 B2
APPLICATION NO. : 12/586446
DATED : July 9, 2013
INVENTOR(S) : Takeo Inagaki et al.

It is certified that error appears in the above-identified patent and that said Letters Patent is hereby corrected as shown below:

On the title page, item (75), insert --Deceased-- after --Gen Fujiki, Tokyo, Japan--.

Signed and Sealed this
Sixth Day of August, 2013

Teresa Stanek Rea
*Acting Director of the United States Patent and Trademark Office*